US012120181B2

(12) United States Patent
Santiago et al.

(10) Patent No.: US 12,120,181 B2
(45) Date of Patent: Oct. 15, 2024

(54) ONBOARD ANALYTICS SYSTEM AND METHODS OF USE

(71) Applicant: The Boeing Company, Chicago, IL (US)

(72) Inventors: Rodolfo A. Santiago, Bellevue, WA (US); Surya Sundar Raj Durairaj, Bangalore (IN); Alyssa Marie De Leon, Redmond, WA (US); Arun Ojha, Seattle, WA (US); Kyle McLaren Hadley, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 366 days.

(21) Appl. No.: 17/584,688

(22) Filed: Jan. 26, 2022

(65) Prior Publication Data

US 2022/0242569 A1 Aug. 4, 2022

Related U.S. Application Data

(60) Provisional application No. 63/144,579, filed on Feb. 2, 2021.

(51) Int. Cl.
*H04L 67/12* (2022.01)
(52) U.S. Cl.
CPC .................................... *H04L 67/12* (2013.01)
(58) Field of Classification Search
CPC ......... G06F 9/5072; G06F 9/50; G16Y 10/40; G16Y 40/20; H04L 67/12; H04L 5/0032; H04L 41/04
See application file for complete search history.

(56) References Cited

U.S. PATENT DOCUMENTS

| 11,422,865 | B2 * | 8/2022 | Fong .................... G06F 9/5083 |
| 11,693,713 | B1 * | 7/2023 | Vohra .................... G06F 9/544 |
| | | | 718/104 |
| 2010/0281166 | A1 | 11/2010 | Buyya et al. |

(Continued)

FOREIGN PATENT DOCUMENTS

CN 106797392 A 5/2017

OTHER PUBLICATIONS

European Patent Office Extended Search Report, dated Jun. 29, 2022 regarding Application No. EP22153487.8, 7 pages.

(Continued)

*Primary Examiner* — David R Lazaro
(74) *Attorney, Agent, or Firm* — Yee & Associates, P.C.

(57) ABSTRACT

An aircraft is configured to perform onboard analytics using available onboard systems. The aircraft comprises a cabin and crew network core with a middleware layer comprising an orchestrator configured to send application containers to a number of cabin and crew network smart members to perform the onboard analytics; and the number of cabin and crew network smart members each having a respective edge member daemon, each edge member daemon configured to place a respective cabin and crew network smart member in a joined state with the middleware layer and release resources of the respective cabin and crew network smart member when it leaves a joined state and enters a busy state so that the edge member daemon does not interfere with a primary function of the respective cabin and crew network smart member.

21 Claims, 6 Drawing Sheets

(56) References Cited

U.S. PATENT DOCUMENTS

| | | | |
|---|---|---|---|
| 2017/0208139 A1 | 7/2017 | Li et al. | |
| 2017/0366616 A1* | 12/2017 | Rodrigues Nascimento | ............... H04W 4/44 |
| 2019/0042322 A1* | 2/2019 | Calhoun | ............. H04L 41/0896 |
| 2019/0098602 A1* | 3/2019 | Costa | ................. H04W 64/003 |
| 2020/0065155 A1* | 2/2020 | Tummuru | ............. G06F 9/4843 |
| 2020/0313959 A1* | 10/2020 | Higuchi | ............. H04L 41/5054 |
| 2021/0011765 A1* | 1/2021 | Doshi | ................... G06F 9/5077 |
| 2021/0014133 A1* | 1/2021 | Maciocco | ........... H04L 41/5009 |
| 2021/0049049 A1* | 2/2021 | Kuik | ...................... G06F 9/5033 |
| 2021/0073047 A1* | 3/2021 | Bhandaru | ............... G06F 9/505 |
| 2021/0185492 A1* | 6/2021 | Higuchi | .................. H04W 4/40 |
| 2021/0232439 A1* | 7/2021 | Fong | ...................... G06F 9/5083 |
| 2021/0312725 A1* | 10/2021 | Milton | .................... G07C 5/008 |
| 2022/0035365 A1* | 2/2022 | Ucar | ...................... G06F 9/5072 |
| 2022/0091899 A1* | 3/2022 | Biernat | ............... G06F 9/45558 |
| 2022/0116456 A1* | 4/2022 | Higuchi | ................ G06F 9/5044 |
| 2022/0242569 A1* | 8/2022 | Santiago | ............... G06F 9/5077 |
| 2023/0076488 A1* | 3/2023 | Goiri Presa | ......... G06F 11/3442 |

OTHER PUBLICATIONS

Yigitoglu et al., "Foggy: A Framework for Continuous Automated IoT Application Deployment in Fog Computing," 2017 IEEE 6th International Conference on AI & Mobile Services (AIMS), Jun. 25-30, 2017, retrieved from the Internet Jun. 14, 2022, 8 pages.—https://ieeexplore.ieee.org/document/8027267.

Canadian Intellectual Property Office (CIPO) Office Action, dated Feb. 15, 2024, regarding Canadian Application No. 3,145,950, 4 pages.

\* cited by examiner

ONBOARD ANALYTICS SYSTEM AND METHODS OF USE

CROSS-REFERENCE TO RELATED APPLICATION

This application claims the benefit of U.S. Provisional Patent Application Ser. No. 63/144,579 filed Feb. 2, 2021, and entitled "Onboard Analytics System and Methods of Use" which is incorporated herein by reference in its entirety.

BACKGROUND INFORMATION

1. Field

The present disclosure relates generally to an aircraft, and more specifically to analyzing data on board an aircraft. Yet more specifically, the present disclosure relates to an onboard analytics system.

2. Background

Aviation Internet of Things (AIoT) will provide fleet level analytics with more data from airplanes. Results from fleet level analytics from AIoT will provide operational advantages. However, transmission and processing of the data will be greatly increased.

Aircraft have not been designed to handle the level of data transmission and processing for AIoT. Airplane to ground transmission has limited bandwidth. Aviation Internet of Things (AIoT) will greatly increase data processing demands for the fleet. Further, some amount of the data processing may take place on an aircraft. However, Onboard computer servers have limited capacities.

Therefore, it would be desirable to have a method and apparatus that take into account at least some of the issues discussed above, as well as other possible issues.

SUMMARY

An embodiment of the present disclosure provides an aircraft configured to perform onboard analytics using available onboard systems. The aircraft comprises a cabin and crew network core with a middleware layer comprising an orchestrator configured to send application containers to a number of cabin and crew network smart members to perform the onboard analytics; and the number of cabin and crew network smart members each having a respective edge member daemon, each edge member daemon configured to place a respective cabin and crew network smart member in a joined state with the middleware layer and release resources of the respective cabin and crew network smart member when it leaves a joined state and enters a busy state so that the edge member daemon does not interfere with a primary function of the respective cabin and crew network smart member.

Another embodiment of the present disclosure provides an onboard analytics system. The onboard analytics system comprises a cabin and crew network core with a middleware layer comprising an orchestrator configured to send application containers to a number of cabin and crew network smart members to support onboard analytics; and the number of cabin and crew network smart members each having a respective edge member daemon, each edge member daemon configured to release resources of the respective cabin and crew network smart member when it leaves a joined state and enters a busy state so that the edge member daemon does not interfere with a primary function of the respective cabin and crew network smart member. Each edge member daemon comprises a monitor configured to listen for commands from the middleware layer and monitor the cabin and crew network smart member CPU, memory, and network usage; a node agent configured to join the middleware layer and receive requests and application containers from an orchestrator of the middleware layer, wherein the monitor is configured to launch the node agent when the cabin and crew network smart member is in a ready state and a join request is received from the middleware layer; and a container runtime configured to run application containers in the cabin and crew network smart member as instructed by the node agent, wherein the monitor is configured to launch the container runtime when the cabin and crew network smart member is in a ready state and a join request is received from the middleware layer.

Yet another embodiment of the present disclosure provides a method of performing onboard analytics using available onboard systems. A cabin and crew network smart member is set to a ready state when the cabin and crew network smart member is capable of honoring requests from distributed edge middleware. The cabin and crew network smart member in the ready state joins the distributed edge middleware to place the cabin and crew network smart member in a joined state in response to receiving a request from the distributed edge middleware of a cabin and crew network core for the cabin and crew network smart member to join the distributed edge middleware. An application container is received by an edge member daemon of the cabin and crew network smart member while the cabin and crew network smart member is joined to the distributed edge middleware. The edge member daemon releases resources of the cabin and crew network smart member when the cabin and crew network smart member leaves the joined state and enters a busy state.

Still another embodiment of the present disclosure provides an aircraft configured to perform onboard analytics using available onboard systems. The aircraft comprises a cabin and crew network core with a middleware layer comprising an orchestrator configured to send application containers to a number of cabin and crew network smart members to perform the onboard analytics; and the number of cabin and crew network smart members each having a respective edge member daemon configured to receive application containers from the orchestrator, each edge member daemon configured to release resources of the respective cabin and crew network smart member so that the edge member daemon does not interfere with a primary function of the respective cabin and crew network smart member.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
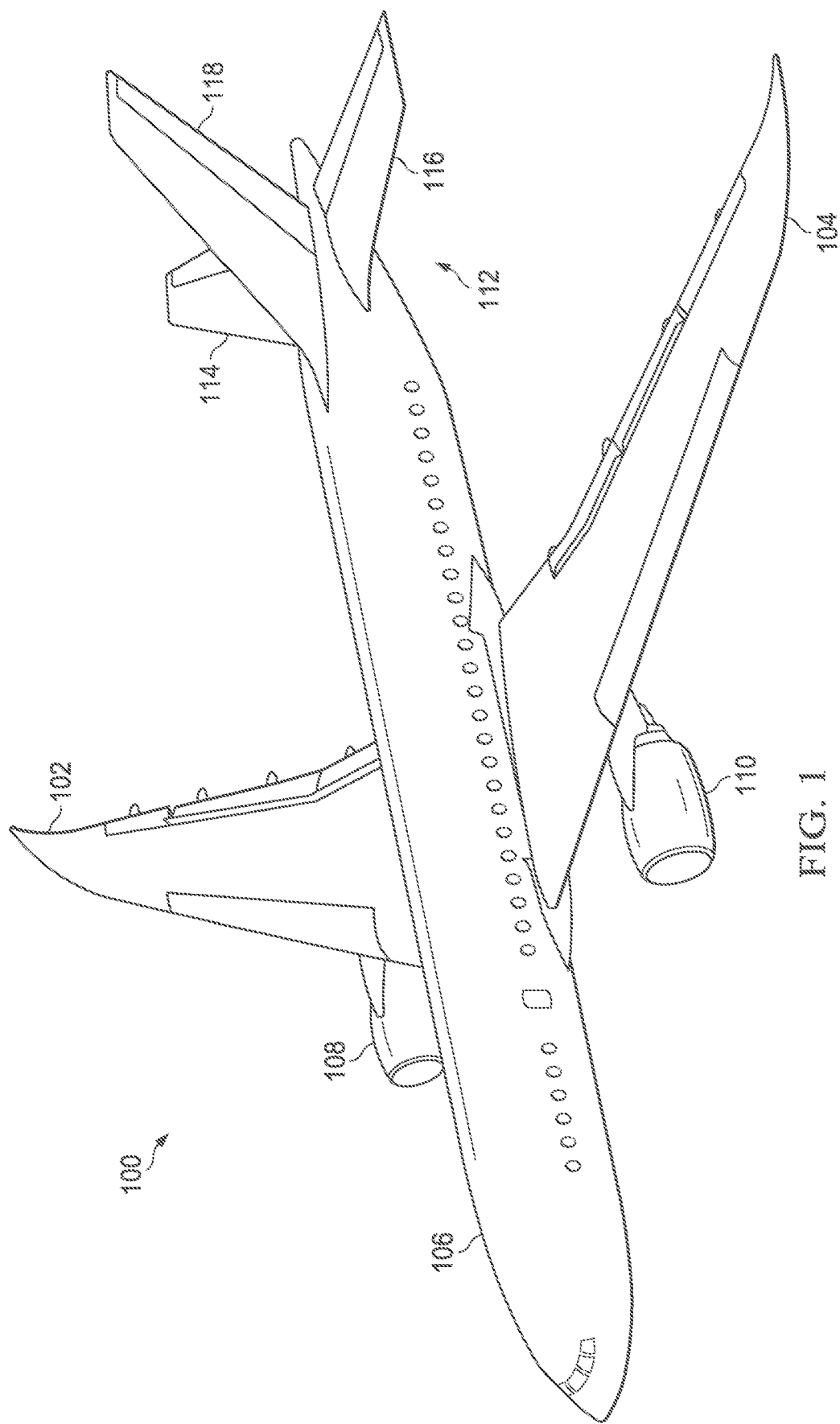
FIG. 1 is an illustration of an aircraft in which an illustrative embodiment may be implemented.

The illustrative examples recognize and take into account one or more different considerations. For example, the illustrative examples recognize and take into account that the "Aviation Internet of Things (AIoT)" will enable fleet level analytics with more data from airplanes. The illustrative examples recognize and take into account that AIoT can exponentially increase the data processing needs.

The illustrative examples recognize and take into account that edge computing is a prevalent solution in Internet of Things (IoT) systems wherein analytics are performed closer to the data sources. The illustrative examples recognize and take into account that airplanes can be viewed as edges of a large AIoT ecosystem. Onboard Edge Computing within AIoT is a subset of analytics can be performed at the edge, onboard an airplane. The illustrative examples recognize and take into account that onboard analytics can provide higher levels of information using less bandwidth.

Onboard analytics to the scale anticipated for AIoT is not being undertaken today. The illustrative examples recognize and take into account that Onboard computer servers, such as an Onboard Network System (ONS) have limited capacities. The illustrative examples recognize and take into account that an Onboard Network System is the central component of the Airplane Information Systems (AIS) Domain on certain aircraft models. This Onboard Network System provides onboard and off-board connectivity and a set of services (such as data load, network storage, print, or others) to the connected systems or applications such as: maintenance devices portable Electronic Flight Bag (EFB), electronic engine control, onboard maintenance system, and other systems or applications.

The illustrative examples recognize and take into account that if AIoT were to be introduced, a conventional approach is to provide additional hardware to address the computation requirements. The illustrative examples also recognize and take into account that it is undesirable to add weight to an aircraft. Adding weight to an aircraft decreases fuel efficiency. Adding weight to an aircraft can also reduce the capacity to carry at least one of passengers or cargo.

The illustrative examples also recognize and take into account that edge computing can make available analytics results to the flight crew and to other onboard systems. The illustrative examples recognize and take into account that it would be desirable to expand onboard computing capacities without additional SWaP (size, weight, power). The illustrative examples recognize and take into account that it would be desirable to reduce onboard and offboard network traffic.

The illustrative examples recognize and take into account that it would be desirable to maximize utilization of available cabin and crew network (CCN) Computing Resources. The illustrative examples recognize and take into account that underutilized non-server resources can be leveraged for AIoT analytics.

In the illustrative examples, instead of introducing additional hardware, computing resources on underutilized CCN Smart Members are harvested. The illustrative examples recognize and take into account that by utilizing resources already present on an aircraft, the weight of the aircraft is not increased.

The illustrative examples provide a middleware layer that utilizes orchestration. By utilizing orchestration rather than hardcoding in the member systems, resources will only be consumed by analytics when they have been dispatched to and are executing on the member systems. Otherwise, those resources are available to the member system's primary function. Further, by utilizing orchestration, CCN smart members may be retrofitted to perform functions associated with onboard analytics.

The illustrative examples provide an onboard analytics system that provides greater data processing capacity by leveraging CCN smart members. The illustrative examples provide an onboard analytics system that prioritizes primary functionality of the CCN smart members over hosted functionality. The illustrative examples allow AIoT applications to be hosted on a CCN smart member only when the CCN smart member is not busy.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which an onboard analytics system may be implemented in accordance with an illustrative embodiment. The onboard analytics system leverages unused resources of a number of CCN smart members of aircraft 100 to support AIoT. For example, at least one of a wireless data gateway, an airplane interface device, crew wireless devices, or smart sensor systems of aircraft 100 can be utilized as a CCN smart member of the onboard analytics system.

Figure 2:
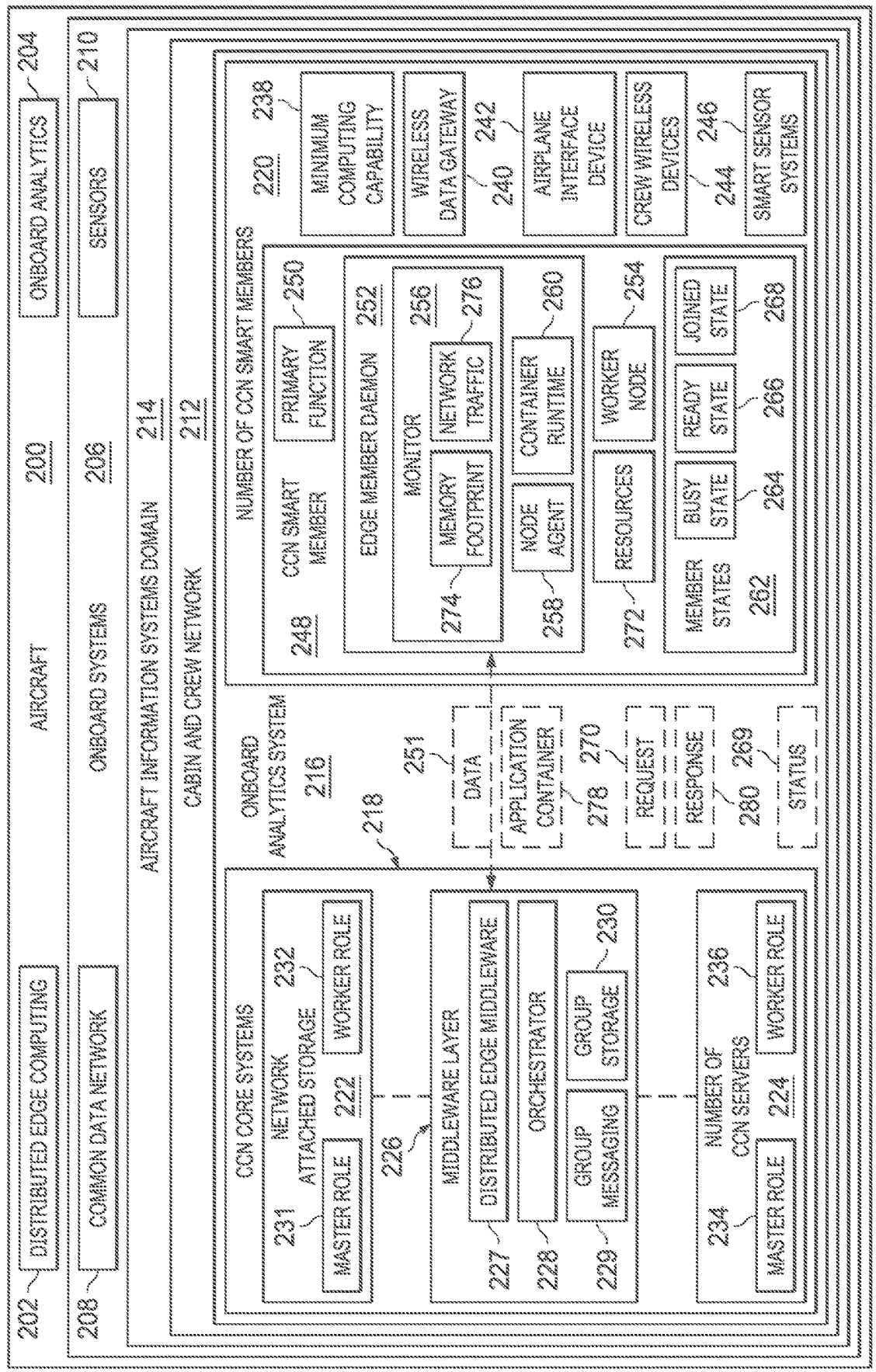
FIG. 2 is an illustration of a block diagram of an aircraft in which an illustrative embodiment may be implemented.

Turning now to FIG. 2, an illustration of a block diagram of an aircraft is depicted in which an illustrative embodiment may be implemented. Aircraft 100 is a physical implementation of aircraft 200 of FIG. 2. Aircraft 200 utilizes distributed edge computing 202 to support onboard analytics 204. Aircraft 200 is configured to perform onboard analytics 204 using available onboard systems 206. Onboard systems 206 include Common Data Network 208, sensors 210, and cabin and crew network 212. Cabin and crew network 212 is part of aircraft information systems domain 214. Cabin and crew network 212 is non flight-critical. In this illustrative example, distributed edge computing 202 is performed in cabin and crew network 212. Relevant data is sourced from sensors 210 or avionics and Common Data Network 208. Onboard analytics system 216 is implemented in cabin and crew network 212.

Onboard analytics system 216 includes cabin and crew network (CCN) core 218 and number of cabin and crew network (CCN) smart members 220. As used herein, "CCN" stands for and is interchangeable with "cabin and crew network." Thus, CCN core 218 is cabin and crew network core. Number of CCN smart members 220 is number of cabin and crew network smart members. CCN core 218 includes Network Attached Storage 222 and number of cabin and crew network (CCN) servers 224.

Middleware layer 226 is present on CCN core 218. In some illustrative examples, middleware layer 226 is referred to as distributed edge middleware 227. Middleware layer 226 is provided for hosting applications on CCN core 218. In some illustrative examples, applications are hosted on CCN core 218 with lower levels of rigor, within isolated execution environments. By operating within isolated execution environments, applications hosted on CCN core 218 meet FAR Part 121 compliance for air carrier certification.

Middleware layer 226 provides a platform for hosting applications within isolated execution environments, such as within application containers. Middleware layer 226 is present on CCN core 218 to present a unified interface to applications and external systems. In some illustrative examples, middleware layer 226 is made up of orchestrator 228, group messaging 229, and group storage 230.

Group Messaging 229 provides a reliable peer-to-peer messaging within cabin and crew network 212. Group Storage 230 provides persistent storage. Group storage 230 is at least one of shared storage and replicated storage. Shared storage is a common networked storage system, such as network attached storage 222 file system, accessible to all nodes in the cabin and crew network 212. Replicated storage comprises local file systems that replicate data to remote peer file systems.

In some illustrative examples, middleware layer 226 provides discovery. Discovery provides name resolution to middleware layer 226 hosted apps. In these illustrative examples, onboard analytics system 216 is an orchestrated multi-mode system, and the location of these services (ip-addr/port) is dynamically determined. Discovery allows clients to determine a location of services (ip-addr/port), regardless of which node the services are deployed, using a well-known name.

Orchestrator 228 provides application/service management. Orchestrator 228 is responsible for container deployment, load-balancing, fault resolution and management of applications/services in the distributed system.

Each host with middleware layer 226 has two roles in orchestration: master and worker. For example, network attached storage 222 can have master role 231 or worker role 232. Each of number of CCN servers 224 can take master role 234 or worker role 236. When network attached storage 222 has master role 231, master role 231 deploys apps and services to middleware layer 226 hosts according to policy. When number of CCN servers 224 have master role 234, master role 234 deploys apps and services to middleware layer 226 hosts according to policy. The masters are redundant and rely on replicated state data.

When network attached storage 222 has worker role 232, network attached storage 222 performs local container management. When number of CCN servers 224 has worker role 236, number of CCN servers 224 performs local container management.

Each of number of CCN smart members 220 has minimum computing capability 238. Minimum computing capability 238 is capable of performing calculations for onboard analytics 204. In some illustrative examples, number of CCN smart members 220 includes at least one of wireless data gateway 240, airplane interface device 242, crew wireless devices 244, or smart sensor systems 246.

Number of CCN smart members 220 includes any desirable quantity of smart members. As used herein, "a number of," when used with reference to items means one or more items. For example, number of CCN smart members 220 is one or more CCN smart members. As depicted, number of CCN smart members 220 includes cabin and crew network (CCN) smart member 248. Smart member 238 has primary function 250. In some illustrative examples, CCN smart member 248 sends data 251 pre-processing directly to CCN core 218 to perform analytics.

Number of CCN smart members 220 each has a respective edge member daemon. Smart member 238 has edge member daemon 252. Edge Member Daemon 252 is software that will allow CCN smart member 248 to join middleware layer 226 of onboard analytics system 216. Edge member daemon 252 allows CCN smart member 248 to function as worker node 254 in middleware layer 226 and can host containers, such as application container 278. Edge member daemon 252 does not interfere with primary function 250 of CCN member system host, CCN smart member 248. When not joined to middleware layer 226, edge member daemon 252 uses minimal resources. Edge member daemon 252 has three components: monitor 256, node agent 258, and container runtime 260.

Monitor 256 is a lightweight process that listens for commands from middleware layer 226 and monitors the CPU, memory usage, and network usage of CCN smart member 248. Monitor 256 listens to commands from middleware layer 226 when resource levels are below given levels.

Edge member daemon 252 operates based upon a current member state of member states 262. CCN smart member 248 is in busy state 264 when CCN smart member 248 is performing primary function 250. When CCN smart member 248 has available resources, CCN smart member 248 is placed in ready state 266. Monitor 256 launches node agent 258 and container runtime 260 when CCN smart member 248 is in ready state 266 and a join request 270 is received from middleware layer 226.

Monitor 256 signals node agent 258 and container runtime 260 to terminate should member resource usage levels rise above given thresholds.

Node agent 258 joins middleware layer 226 and receives requests and application containers from orchestrator 228. In some illustrative examples, requests may also be called "commands". In some illustrative examples, application containers may also be called "specifications". Node agent 258 passes the request to container runtime 260.

Container runtime 260 runs application containers in CCN smart member 248 as commanded by node agent 258. Node agent 258 and container runtime 260 make CCN smart member 248 act as worker node 254 in middleware layer 226.

Edge member daemon 252 prioritizes primary function 250 over hosted functionality. CCN smart member 248 has edge member daemon 252 configured to receive application containers, such as application container 278, from orchestrator 228. Edge member daemon 252 is configured to release resources 272 of CCN smart member 248 so that edge member daemon 252 does not interfere with primary function 250 of CCN smart member 248. CCN smart member 248 has edge member daemon 252 configured to place CCN smart member 248 in joined state 268 with middleware layer 226 and release resources 272 of CCN smart member 248 when it leaves joined state 268 and enters busy state 264 so that edge member daemon 252 does not interfere with primary function 250 of CCN smart member 248.

When CCN smart member 248 is in busy state 264, CCN smart member 248 is not connected to distributed edge middleware 227. In some illustrative examples, when CCN smart member 248 is in busy state 264, CCN smart member 248 does not carry out any tasks for onboard analytics system 216. In some illustrative examples, when CCN smart member 248 is in busy state 264, CCN smart member 248 performs primary function 250. While CCN smart member 248 is in busy state 264, edge member daemon 252 maintains memory footprint 274 that is desirably small so that edge member daemon 252 does not interfere with primary function 250 of its CCN member system host, CCN smart member 248. While CCN smart member 248 is in busy state 264, edge member daemon 252 sends minimal network traffic 276 so that edge member daemon 252 does not interfere with primary function 250 of its CCN member system host, CCN smart member 248.

When not joined to middleware layer 226, edge member daemon 252 uses minimal resources. When CCN smart member 248 is in busy state 264, edge member daemon 252 views CCN smart member 248 as unable to carry out additional tasks.

When CCN smart member 248 sends a signal of not_busy to edge member daemon 252, edge member daemon 252 regards CCN smart member 248 as in ready state 266. When CCN smart member 248 is in ready state 266, CCN smart member 248 is able to carry out additional tasks and can honor requests from middleware layer 226.

When CCN smart member 248 is in ready state 266, edge member daemon 252 can send status 269 to middleware layer 226 to notify middleware layer 226 of ready state 266. When CCN smart member 248 is in ready state 266, CCN smart member can receive request 270 from middleware layer 226 of onboard analytics system 216. When edge member daemon 252 receives request 270 from middleware layer 226, CCN smart member 248 is placed into joined state 268. When CCN smart member 248 has joined state 268, edge member daemon 252 then reserves resources 272 within CCN smart member 248 and assumes worker node 254 status in middleware layer 226.

Once joined, edge member daemon 252 receives orchestration requests (commands) from orchestrator 228 of the middleware layer 226. In some illustrative examples, middleware layer 226 dispatches application container 278 to CCN smart member 248 while joined state 268.

CCN smart member 248 transitions from joined state 268 to ready state 266 upon eviction by middleware layer 226 or the completion of the task of application container 278. Upon completion of application container 278 by CCN smart member 248, edge member daemon 252 sends response 280 to middleware layer 226. Response 280 includes results of the analysis of application container 278.

CCN smart member 248 transitions to busy state 264 when CCN smart member 248 indicates to edge member daemon 252 that it is in busy state 264. Edge member daemon 252 releases resources 272 of CCN smart member 248 when it leaves joined state 268 due to a busy indication.

Aircraft 200 is configured to perform onboard analytics 204 using available onboard systems 206. Aircraft 200 comprises CCN core 218 with middleware layer 226 comprising orchestrator 228 configured to send application containers 278 to number of CCN smart members 220 to perform onboard analytics 204; and number of CCN smart members 220 each having a respective edge member daemon 252, each edge member daemon 252 configured to place a respective cabin and crew network (CCN) smart member 248 in joined state 268 with middleware layer 226 and release resources 272 of respective CCN smart member 248 when it leaves joined state 268 and enters busy state 264 so that edge member daemon 252 does not interfere with primary function 250 of respective CCN smart member 248.

CCN core 218 comprises number of CCN servers 224 and network attached storage 222. In some illustrative examples, orchestrator 228 is responsible for container deployment, load-balancing, fault resolution, and management of applications in a distributed system, onboard analytics system 216, comprising CCN core 218 and number of CCN smart members 220.

In some illustrative examples, number of CCN smart members 220 comprises at least one of wireless data gateway 240, airplane interface device 242, crew wireless device 244, or smart sensor system 246.

In some illustrative examples, respective edge member daemon 252 transitions respective CCN smart member 248 from joined state 268 to ready state 266 upon eviction by middleware layer 226 or completion of application container 278.

In some illustrative examples, respective edge member daemon 252 transitions respective CCN smart member 248 from either joined state 268 or ready state 266 to busy state 264 when CCN smart member 248 indicates to respective edge member daemon 252 that it is busy.

In some illustrative examples, each respective edge member daemon 252 is configured to maintain minimal memory footprint 274 and send minimal network traffic 276 when respective CCN smart member 248 is in busy state 264.

In some illustrative examples, each edge member daemon 252 comprises monitor 256 configured to listen for commands, such as request 270, from middleware layer 226 and monitor cabin and crew network smart member CPU, memory, and network usage.

In some illustrative examples, each edge member daemon 252 comprises node agent 258 configured to join middleware layer 226 and receive commands, such as request 270, and specifications, such as application container 278, from orchestrator 228 of middleware layer 226, wherein monitor 256 is configured to launch node agent 258 when CCN smart member 248 is in ready state 266 and join request 270 is received from middleware layer 226.

In some illustrative examples, each edge member daemon 252 comprises container runtime 260 configured to run application containers in the cabin and crew network smart member as instructed by the node agent, wherein the monitor is configured to launch the container runtime when the cabin and crew network smart member is in a ready state and a join request is received from the middleware layer. Monitor 256 is configured to signal node agent 258 and container runtime 260 to terminate when resource usage levels of CCN smart member 248 rise above given thresholds.

The illustration of onboard analytics system 216 of aircraft 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although number of CCN smart members 220 is depicted having a single CCN smart member, number of CCN smart members 220 can include any quantity of CCN smart members. As another example, number of CCN smart members 220 can include another non-depicted type of CCN smart member having minimum computing capability 238.

Figure 3:
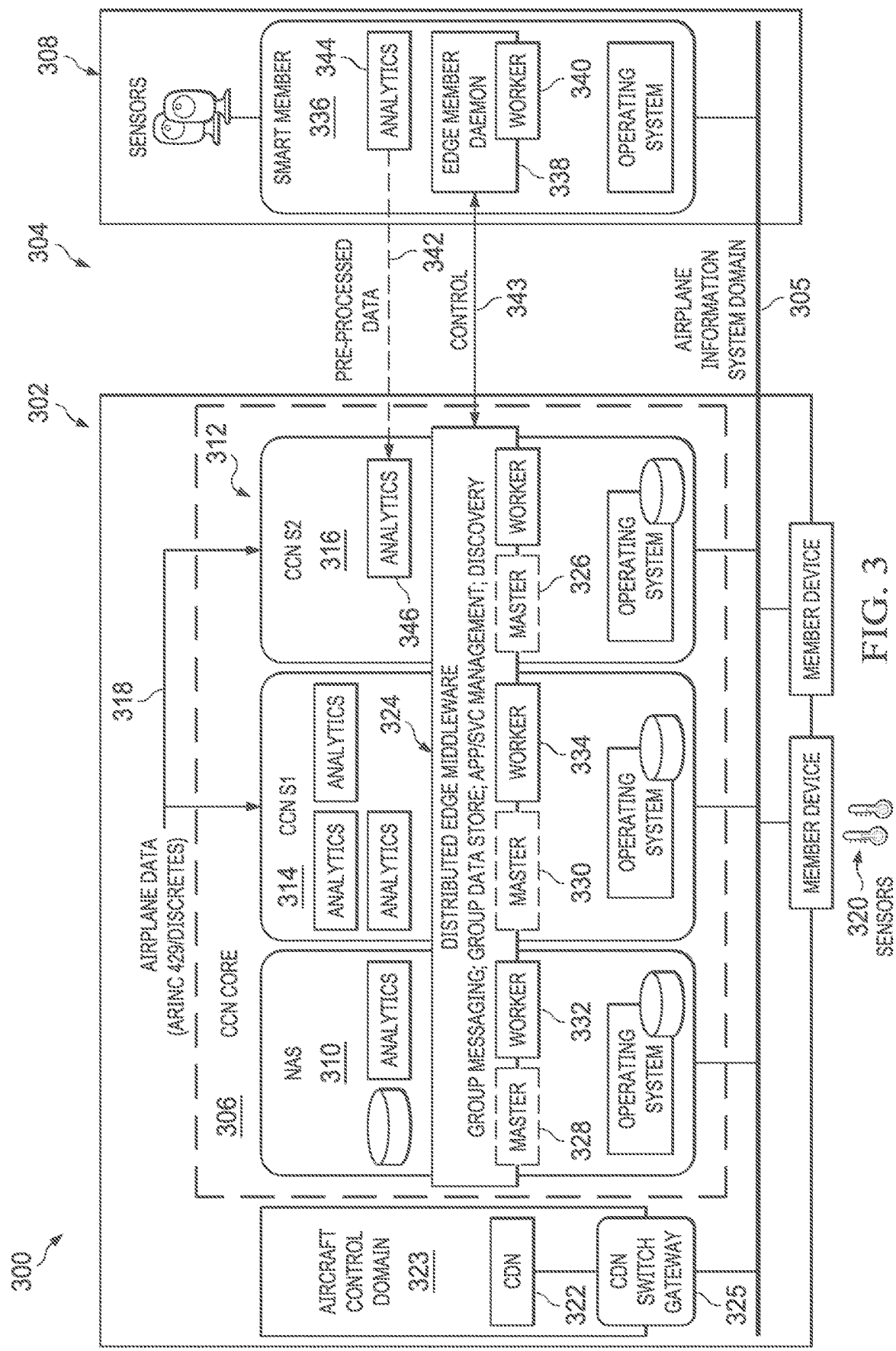
FIG. 3 is an illustration of an onboard analytics system in accordance with an illustrative embodiment.

Turning now to FIG. 3, an illustration of an onboard analytics system is depicted in accordance with an illustrative embodiment. Diagram 300 of onboard analytics system 302 is a representation of onboard analytics system 216 of FIG. 2. Onboard analytics system 302 provides for Distributed Edge Computing (DEC) in Cabin and Crew Network (CCN) 304. Cabin and Crew Network 304 is part of the Aircraft Information Systems Domain (AISD) 305 and is non-flight-critical. Cabin and Crew Network 304 includes CCN core 306 and number of CCN smart members 308.

CCN core 306 includes network attached storage 310 and number of CCN servers 312. As depicted, number of CCN servers 312 includes first CCN server 314 and second CCN server 316. Airplane data 318 is provided to CCN server 314 and second CCN server 316. Relevant data is sourced from sensors 320 or avionics and the Common Data Network (CDN) 322.

Aircraft Control Domain (ACD) 323 is the network domain for flight control avionics. A large amount of data is produced in aircraft control domain 323 and can be staged in Common Data Network (CDN) 322. Some of this data is allowed to be published to Airplane Information System Domain (AISD) 305 and CCN Core 306 for offboarding or onboard analysis. Data from Aircraft Control Domain 323 present on Common Data Network (CDN) 322 can be made available to Airplane Information System Domain (AISD) 305 via a domain guard, CDN Switch Gateway 325. Aircraft control domain 323 including Common Data Network (CDN) 322 has a very large amount of data to be processed. By having Distributed Edge Computing (DEC) in Cabin and Crew Network (CCN) 304, onboard analytics is provided close to the data source, Aircraft Control Domain 323.

Middleware layer 324 is present on each system of CCN core 306 in cabin and crew network 304. As depicted, second CCN server 316 acts as master 326. In some illustrative examples, network attached storage 310 can be master 328. In some illustrative examples, CCN server 314 can be master 330. As illustrated, network attached storage 310 acts as worker 332. As illustrated, CCN server 314 acts as worker 334.

Number of CCN smart members 308 includes CCN smart member 336. CCN smart member 336 has edge member daemon 338. Control channel 343 exists between middleware layer 324 and edge member daemon 338. Edge member daemon 338 sends its status via control channel 343 to middleware layer 324. Middleware layer 324 sends join requests via control channel 343. Edge member daemon 338 configures CCN smart member 336 to act as worker 340 in middleware layer 324. Middleware layer 324 sends application container specifications via control channel 343. Edge member worker 340 starts analytics 344 on smart member 336. In some illustrative examples, analytics 344 sends preprocessed data 342 directly to analytics 346 on second CCN server 316 to perform further processing.

Figure 4:
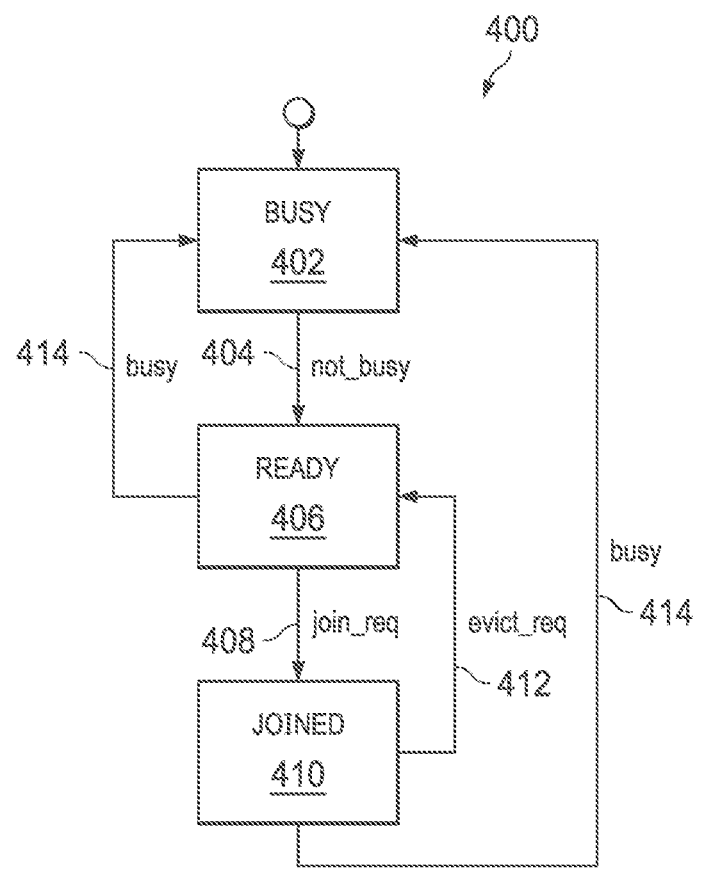
FIG. 4 is a flowchart of a flowchart for changing states in accordance with an illustrative embodiment.

Turning now to FIG. 4, a flowchart of a state transition diagram for a CCN smart member is depicted in accordance with an illustrative embodiment. Flowchart 400 is an example of changing states for CCN smart member 248 of FIG. 2. Flowchart 400 is an example of changing states for CCN smart member 336 of FIG. 3.

An Edge Member Daemon (the daemon) is software that will allow a CCN Smart Member to join the middleware layer of the onboard analytics system. The daemon allows the CCN Smart Member to function as a worker node in the middleware layer and can host application containers.

When the CCN smart member is busy 402, the CCN smart member is not connected to the distributed edge middleware. In some illustrative examples, when the CCN smart member is busy 402, the CCN smart member does not carry out any tasks for the onboard analytics system. In some illustrative examples, when the CCN smart member is busy 402, the CCN smart member performs its primary function. While the CCN smart member is busy 402, the daemon maintains a small memory footprint and sends minimal network traffic so that the daemon does not interfere with the primary function of its CCN member system host. When not joined to DEC, the daemon uses minimal resources. When the CCN smart member is busy 402, the daemon views the CCN smart member as unable to carry out additional tasks.

When CCN smart member sends a signal of not_busy 404 to the daemon, the daemon regards the CCN smart member as ready 406. When the CCN smart member has a state of ready 406, the CCN member is able to carry out additional tasks and can honor requests from the DEC.

When the CCN member is ready 406, the CCN member can receive join-req 408 from distributed edge middleware of an onboard analytics system. When the daemon receives join-req 408 from the middleware layer, the CCN smart member is joined 410. When the CCN smart member has joined 410 state, the daemon then reserves resources within the CCN smart member and assumes worker node status in the middleware layer.

Once joined, the daemon receives orchestration requests, such as request 270 from FIG. 2, from an orchestrator of the middleware layer. The orchestration requests may also be referred to as orchestration commands. In some illustrative examples, the middleware layer dispatches an application container to the CCN smart member while joined 410.

The CCN smart member transitions from joined 410 state to ready 406 state upon eviction, evict-req 412, by the middleware layer or the completion of task. The CCN smart member transitions to busy 402 state when the CCN smart member indicates to the daemon that its busy 414. The daemon releases resources of the CCN smart member when it leaves joined 410 state due to busy 414 indication.

The middleware layer defines a platform for hosting applications within isolated execution environments, such as within containers. The middleware is layered on CCN core to present a unified interface to applications and external systems.

The Edge Member Daemon (the daemon) is configured to not interfere with the primary function of its CCN smart member system host. When not joined to the middleware layer, the daemon uses minimal resources. The daemon views the CCN smart member system as having a state transition diagram as illustrated in flowchart 400.

Figure 5:
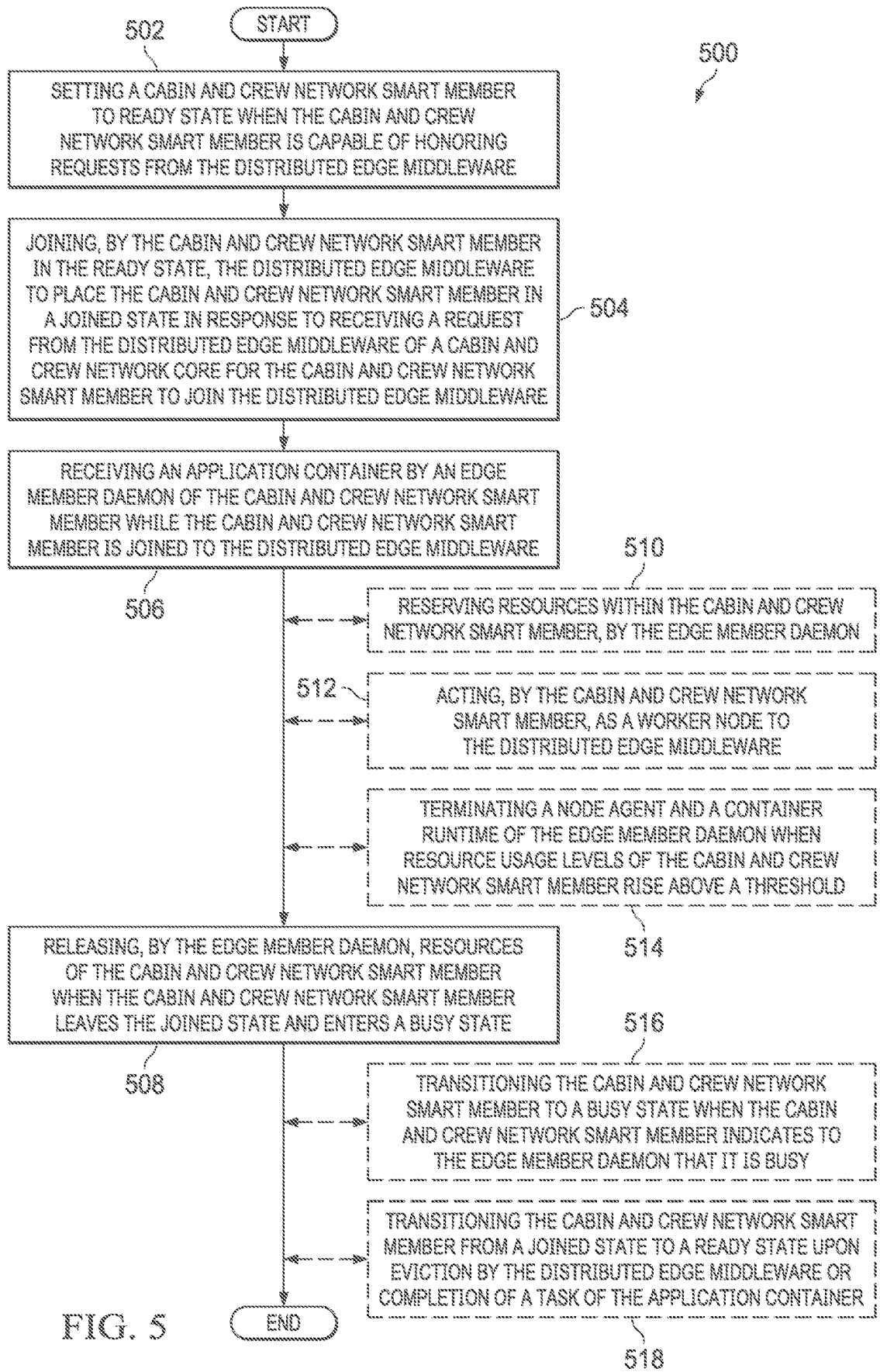
FIG. 5 is a flowchart of a method for performing onboard analytics using available onboard systems in accordance with an illustrative embodiment.

Turning now to FIG. 5, a flowchart of a method for performing onboard analytics using available onboard systems in accordance with an illustrative embodiment. Method 500 can be performed using onboard analytics system 216 of FIG. 2. Method 500 can be performed using onboard analytics system 302 of FIG. 3. Method 500 can be performed as a CCN smart member goes through states of flowchart 400 of FIG. 4.

Method 500 sets a cabin and crew network smart member to ready state when the cabin and crew network smart member is capable of honoring requests from distributed edge middleware (operation 502). In some illustrative examples, the cabin and crew network smart member is in ready state when the cabin and crew network smart member is not performing the primary function. In some illustrative examples, the cabin and crew network smart member is in ready state when the cabin and crew network smart member has available resources.

In method 500, the cabin and crew network smart member in the ready state joins the distributed edge middleware to place the cabin and crew network smart member in a joined state in response to receiving a request from the distributed edge middleware of a cabin and crew network core for the cabin and crew network smart member to join the distributed edge middleware (operation 504). In some illustrative examples, when cabin and crew network smart member is in the joined state, the cabin and crew network smart member is capable of receiving applications/services from the middleware layer. In some illustrative examples, when cabin and crew network smart member is in the joined state, the cabin and crew network smart member is capable of receiving an application container from the middleware layer.

Method 500 receives an application container by an edge member daemon of the cabin and crew network smart member while the cabin and crew network smart member is joined to the distributed edge middleware (operation 506). The application container takes any desirable form. In some illustrative examples, the application container is an analytics application. In some illustrative examples, the application container is pre-analytics processing to assist analytics hosted in the middleware layer CCN core layers. In some illustrative examples, the application container is data compression/filtering to reduce off-load bandwidth.

Method 500 releases, by the edge member daemon, resources of the cabin and crew network smart member when the cabin and crew network smart member leaves the joined state and enters a busy state (operation 508). By releasing the resources of the cabin and crew network smart member, the edge member daemon does not undesirably affect the performance of the primary function of the cabin and crew network smart member. After releasing the resources of the cabin and crew network smart member, the edge member daemon has a desirably small memory footprint. Afterwards, the method terminates.

In some illustrative examples, the edge member daemon reserves resources within the cabin and crew network smart member (operation 510). The edge member daemon reserves resources for the performance of an analytics application. In some illustrative examples, the cabin and crew network smart member acts as a worker node to the distributed edge middleware (operation 512).

In some illustrative examples, method 500 terminates a node agent and a container runtime of the edge member daemon when resource usage levels of the cabin and crew network smart member rise above a threshold (operation 514). In some illustrative examples, when the resource usage levels of the cabin and crew network smart member rise about the threshold, the cabin and crew network smart member is performing the primary function. In some illustrative examples, when the resource usage levels of the cabin and crew network smart member rise about the threshold, the cabin and crew network smart member is performing functions unrelated to the middleware layer.

In some illustrative examples, method 500 transitions the cabin and crew network smart member to a busy state when the cabin and crew network smart member indicates to the edge member daemon that it is busy (operation 516). In some illustrative examples, method 500 transitions the cabin and crew network smart member from a joined state to a ready state upon eviction by the distributed edge middleware or completion of a task of the application container (operation 518).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 510 through operation 518 may be optional.

Figure 6:
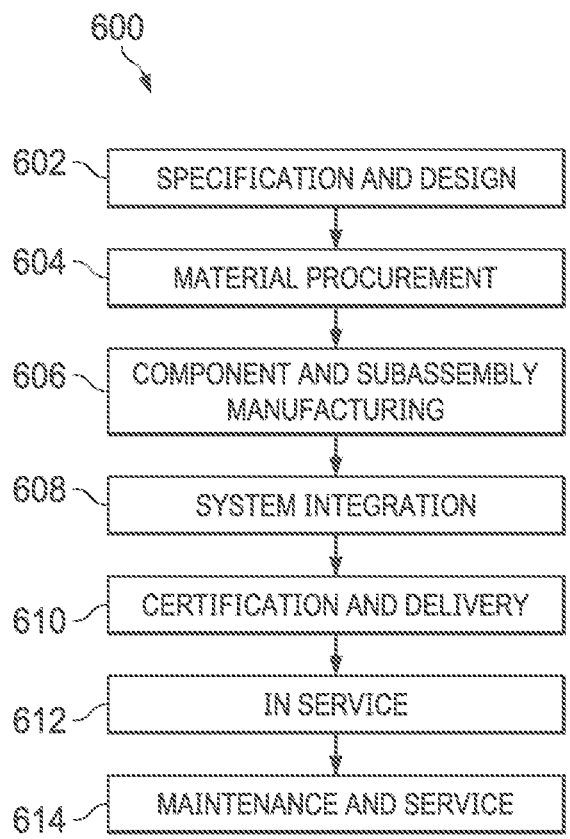
FIG. 6 is an illustration of an aircraft manufacturing and service method in a form of a block diagram in accordance with an illustrative embodiment.
Figure 7:
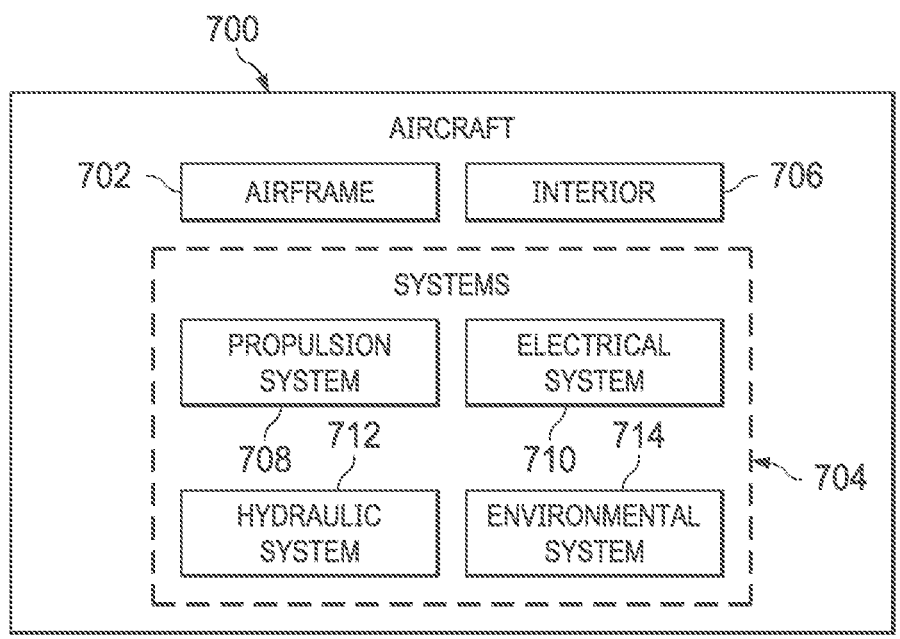
FIG. 7 is an illustration of an aircraft in a form of a block diagram in which an illustrative embodiment may be implemented.

Illustrative embodiments of the present disclosure may be described in the context of aircraft manufacturing and service method 600 as shown in FIG. 6 and aircraft 700 as shown in FIG. 7. Turning first to FIG. 6, an illustration of an aircraft manufacturing and service method is depicted in accordance with an illustrative embodiment. During pre-production, aircraft manufacturing and service method 600 may include specification and design 602 of aircraft 700 in FIG. 7 and material procurement 604.

During production, component and subassembly manufacturing 606 and system integration 608 of aircraft 700 takes place. Thereafter, aircraft 700 may go through certification and delivery 610 in order to be placed in service 612. While in service 612 by a customer, aircraft 700 is scheduled for routine maintenance and service 614, which may include modification, reconfiguration, refurbishment, or other maintenance and service.

Each of the processes of aircraft manufacturing and service method 600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 7, an illustration of an aircraft is depicted in which an illustrative embodiment may be implemented. In this example, aircraft 700 is produced by aircraft manufacturing and service method 600 of FIG. 6 and may include airframe 702 with plurality of systems 704 and interior 706. Examples of systems 704 include one or more of propulsion system 708, electrical system 710, hydraulic system 712, and environmental system 714. Any number of other systems may be included.

Apparatuses and methods embodied herein may be employed during at least one of the stages of aircraft manufacturing and service method 600. One or more illustrative embodiments may be used during component and subassembly manufacturing 606, system integration 608, in service 612, or maintenance and service 614 of FIG. 6. Method 500 may be performed during in service 612 to perform onboard analytics in aircraft 700. Onboard analytics system 216 of FIG. 2 can be used to perform or support onboard analytics 204 during either in service 612 or maintenance and service 614 of FIG. 6. In some illustrative examples, middleware layer 226 and edge member daemon 252 are installed during one of subassembly manufacturing 606 or system integration 608 prior to aircraft 700 being in service 612. In some illustrative examples, at least one of middleware layer 226 or edge member daemon 252 is installed during maintenance and service 614 to retrofit cabin and crew network 212 to include onboard analytics system 216.

The illustrative examples provide an onboard analytics system. The onboard analytics system allows for expanding onboard computing capacities without additional SWaP (size, weight, power) to the aircraft.

The illustrative examples solve the problem of implementation of Aviation Internet of Things (AIoT) with the limited bandwidth of airplane to ground transmission. The illustrative examples allow for implementation of an Aviation Internet of Things (AIoT) without undesirably adding SWaP (size, weight, power) to the aircraft. The illustrative examples will reduce onboard and offboard network traffic due to onboard analytics.

Implementing AIoT will greatly increase the data processing needs. Onboard computer servers (e.g., ONS) have limited capacities. The illustrative examples leverage underutilized non-server resources for AIoT analytics. Onboard analytics to the scale anticipated for AIoT is not being undertaken today. The illustrative examples solve the problem of the additional computation requirements without adding dedicated data processing equipment and undesirable weight. The illustrative examples maximize utilization of available CCN computing resources.

Instead of introducing additional hardware, computing resources on underutilized CCN 'Smart Members' are harvested. Primary functionality is prioritized over hosted functionality, allowing AIoT applications to be hosted only when not busy.

In Onboard Edge Computing within AIoT, the airplanes can be viewed as edges of the large AIoT ecosystem. A subset of analytics can be performed at the edge (i.e., onboard). Onboard analytics can provide higher levels of information using less bandwidth. Edge Computing can make analytics results available to the flight crew and to other onboard systems.

The illustrative examples provide Distributed Edge Computing (DEC) in the Cabin and Crew Network (CCN). The CCN is part of the Aircraft Information Systems Domain (AISD) and is non-flight-critical. Relevant data is sourced from sensors or avionics and the Common Data Network (CDN).

The CCN core includes the CCN Servers and Network Attached Storage (NAS). The DEC is a middleware layer on the CCN core. The DEC provides a platform for hosting applications on the CCN core, possibly with lower levels of rigor, within isolated execution environments.

At the fringes of the CCN are the data sources, IoT gateways and other devices. The CCN Smart Members are CCN fringe devices with enough computing capability to perform analyses, for example: Wireless Data Gateway (WDG), Airplane Interface Device (AID), Crew Wireless Devices (CWD).

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft configured to perform onboard analytics, wherein the aircraft comprises:
systems onboard the aircraft that comprise a number of cabin and crew smart members;
a cabin and crew network core that comprises a number of servers joined to a middleware layer within the cabin and crew network core that comprises an orchestrator configured to send application containers to the number of cabin and crew network smart members, wherein the application containers are configured to perform the onboard analytics and the number of cabin and crew network smart members each comprise a respective edge member daemon, each edge member daemon configured to:
place a respective cabin and crew network smart member in a joined state with the middleware layer; and
release, responsive to a busy state, resources of the respective cabin and crew network smart member and thereby preclude an interference with a primary function of the respective cabin and crew network smart member.

2. The aircraft of claim 1, wherein the cabin and crew network core comprises a number of cabin and crew network servers and network attached storage.

3. The aircraft of claim 1, wherein the orchestrator is responsible for container deployment, load-balancing, fault resolution, and management of applications in a distributed system comprising the cabin and crew network core and the number of cabin and crew network smart members.

4. The aircraft of claim 1, wherein the number of cabin and crew network smart members comprises at least one of a wireless data gateway, an airplane interface device, a crew wireless device, or a smart sensor system.

5. The aircraft of claim 1, wherein the respective edge member daemon transitions the respective cabin and crew network smart member from a joined state to a ready state upon eviction by the middleware layer or completion of an application container.

6. The aircraft of claim 1, wherein the respective edge member daemon transitions the respective cabin and crew network smart member from either a joined state or a ready state to a busy state when the cabin and crew network smart member indicates to the respective edge member daemon that it is busy.

7. The aircraft of claim 1, wherein each respective edge member daemon is configured to maintain a minimal memory footprint and send minimal network traffic when the respective cabin and crew network smart member is in a busy state.

8. The aircraft of claim 1, wherein each edge member daemon comprises a monitor configured to listen for requests from the middleware layer and monitor the cabin and crew network smart member CPU, memory, and network usage.

9. The aircraft of claim 8, wherein each edge member daemon comprises a node agent configured to join the middleware layer and receive requests and application containers from an orchestrator of the middleware layer, wherein the monitor is configured to launch the node agent when the cabin and crew network smart member is in a ready state and a join request is received from the middleware layer.

10. The aircraft of claim 9, wherein each edge member daemon comprises a container runtime configured to run application containers in the cabin and crew network smart member as instructed by the node agent, wherein the monitor is configured to launch the container runtime when the cabin and crew network smart member is in a ready state and a join request is received from the middleware layer.

11. The aircraft of claim 10, wherein the monitor is configured to signal the node agent and container runtime to terminate when resource usage levels of the cabin and crew network smart member rise above given thresholds.

12. An onboard analytics system that comprises:
systems onboard an aircraft that comprise a number of cabin and crew smart members;
a cabin and crew network core that comprises a middleware layer that comprises an orchestrator configured to send application containers to the number of cabin and crew network smart members, wherein the application containers are configured to support onboard analytics and the number of cabin and crew network smart members each comprise a respective edge member daemon, each edge member daemon configured to release resources of the respective cabin and crew network smart member responsive to a departure from a joined state and thereby preclude an interference with a primary function of the respective cabin and crew network smart member, wherein each edge member daemon comprises:
a monitor configured to listen for requests from the middleware layer and monitor the cabin and crew network smart member CPU, memory, and network usage;
a node agent configured to join the middleware layer and receive requests and application containers from an orchestrator of the middleware layer, wherein the monitor is configured to launch the node agent responsive to a ready state of the cabin and crew network smart member and a join request from the middleware layer; and
a container runtime configured to run application containers in the cabin and crew network smart member as instructed by the node agent, wherein the monitor is configured to launch the container runtime responsive to a ready state of the cabin and crew network smart member and a join request from the middleware layer.

13. The onboard analytics system of claim 12, wherein each respective edge member daemon is configured to maintain a minimal memory footprint and send minimal network traffic when the respective cabin and crew network smart member is in a busy state.

14. The onboard analytics system of claim 12, wherein the cabin and crew network smart members comprise at least one of a wireless data gateway, an airplane interface device, a crew wireless device, or a smart sensor system.

15. The onboard analytics system of claim 12, wherein the cabin and crew network core comprises a number of cabin and crew network servers and network attached storage.

16. A method of performing onboard analytics using systems available onboard a vehicle, the method comprising:
setting a cabin and crew network smart member onboard the vehicle to a ready state when the cabin and crew network smart member comprises a capacity for honoring requests from distributed edge middleware;
joining, by the cabin and crew network smart member in the ready state, the distributed edge middleware to place the cabin and crew network smart member in a joined state in response to receiving a request from the distributed edge middleware of a cabin and crew network core for the cabin and crew network smart member to join the distributed edge middleware;
receiving an application container by an edge member daemon of the cabin and crew network smart member while the cabin and crew network smart member is joined to the distributed edge middleware; and
releasing, by the edge member daemon, resources of the cabin and crew network smart member when the cabin and crew network smart member leaves the joined state and enters a busy state.

17. The method of claim 16 further comprising:
reserving resources within the cabin and crew network smart member, by the edge member daemon; and
acting, by the cabin and crew network smart member, as a worker node to the distributed edge middleware.

18. The method of claim 16 further comprising:
terminating a node agent and a container runtime of the edge member daemon when resource usage levels of the cabin and crew network smart member rise above a threshold.

19. The method of claim 16 further comprising:
transitioning the cabin and crew network smart member to a busy state when the cabin and crew network smart member indicates to the edge member daemon that it is busy.

20. The method of claim 16 further comprising:
transitioning the cabin and crew network smart member from a joined state to a ready state upon eviction by the distributed edge middleware or completion of a task of the application container.

21. An aircraft that comprises:
systems onboard the aircraft that comprise a number of cabin and crew smart members configured to perform analytics onboard the aircraft:
a cabin and crew network core that comprises a middleware layer that comprises an orchestrator configured to send application containers to the number of cabin and crew network smart members, wherein the number of cabin and crew network smart members each comprise a respective edge member daemon configured to receive application containers from the orchestrator, each edge member daemon configured to release resources of the respective cabin and crew network smart member and thereby preclude an interference with a primary function of the respective cabin and crew network smart member.

\* \* \* \* \*